United States Patent [19]

Alexander

[11] Patent Number: 4,979,253
[45] Date of Patent: Dec. 25, 1990

[54] HYDRAULIC CIRCUIT FOR CONTROL OF LIP OF VERTICALLY STORING DOCK LEVELER

[75] Inventor: James C. Alexander, London, Canada

[73] Assignee: Serco Corporation, Ontario, Canada

[21] Appl. No.: 373,546

[22] Filed: Jun. 30, 1989

[51] Int. Cl.$^5$ .............................................. E01D 1/00
[52] U.S. Cl. .................................... 14/71.7; 14/71.3
[58] Field of Search ...................... 14/71.1, 71.3, 71.7

[56] References Cited

U.S. PATENT DOCUMENTS

| | | | |
|---|---|---|---|
| 3,388,413 | 6/1968 | Clarke | 14/71.7 |
| 3,656,199 | 4/1972 | Bregantini | 14/71.7 |
| 4,343,058 | 8/1982 | Loblick | 14/71.7 |
| 4,383,549 | 5/1983 | Maldavs | 137/514.7 |

Primary Examiner—Ramon S. Britts
Assistant Examiner—Matthew Smith
Attorney, Agent, or Firm—Sughrue, Mion, Zinn, Macpeak & Seas

[57] ABSTRACT

In a vertically storing dock leveler, more efficient, faster storage is enabled by providing a circuit which causes the lip of the leveler to maintain its position while the leveler platform is being raised. This position retention is in contrast to prior systems, in which raising the platform automatically caused pressure in the hydraulic cylinder controlling lip movement to drop, causing the lip to retract. By maintaining the lip position, lip extension can take less time.

3 Claims, 4 Drawing Sheets

HYDRAULIC CIRCUIT FOR CONTROL OF LIP OF VERTICALLY STORING DOCK LEVELER

This invention relates to an hydraulic control circuit for a vertically storing dock leveler, offering, among other features, enhanced control over a platform of the leveler in emergency situations. The invention relates more particularly to a circuit for speeding up the operation of the leveler by extending the leveler lip as soon as possible during raising of the platform.

There are horizontally storing and vertically storing dock levelers. Horizontally storing dock levelers are stored so that their platforms are raised into position for operation, and vertically storing dock levelers are stored so that their platforms are lowered into position for operation. A conventional horizontally storing dock leveler usually is installed in a pit in a bay of a loading dock. The platform version is raised into position using an hydraulic pump which pumps fluid, usually oil, through various control valves to and from hydraulic cylinders. Once the deck is raised to a sufficient height, and the lip is extended, the deck is allowed to fall by gravity so that it may float up and down with the truck or other vehicle being loaded.

Some horizontally storing models have employed an hydraulic circuit including a normally open (N/O) main solenoid valve, and an electrically operated "emergency stop" valve to hold the deck in a partially raised position. An example of the electrical and hydraulic control circuits for this conventional approach are shown in FIGS. 1 and 2.

In FIG. 2, a pump manifold 1 contains a shuttle valve 25, a pump 30, and a motor 35. When the motor 35 is energized, and the pump 30 is started, fluid is caused to flow from a reservoir 7 through the pump 30. The shuttle valve 25 thus is moved to the left, so that fluid flows through the conduit indicated by arrow 25a, and out of a primary port 3 of the pump manifold 1.

Fluid flowing out of the primary port 3 enters a lip cylinder 160 at its retract (rod) end, and also passes through solenoid valve 20 to a main lift cylinder 110. Fluid flowing into both places causes the main lift cylinder 110 to extend, and fluid to flow out of the extend (piston) end of the lip cylinder 160 and into a secondary port 5. A sequence valve 15 is set so that fluid entering the secondary port 5 passes through the valve 15 and into the reservoir 7. As a result, the lip of the leveler retracts as the platform extends.

When the main lift cylinder is fully extended, pressure builds at the primary port 3. As a result, the sequence valve 15 is switched over (in FIG. 2, it is moved to the right against pressure exerted by a spring 16), so that flow may be reversed through the secondary port 5. As a result, the lip cylinder 160 extends, causing the lip of the leveler to extend. Thus, the lip extends after the platform extends.

Conventionally, then, the movement of the lip has been incidental to the raising and lowering of the platform. As a result of the foregoing, each time the pump 30 is started to raise the platform, the lip folds. When the platform then is lowered, the lip can be returned to the stored (retracted) position.

Automatic folding of the lip is not desirable in vertically storing dock levelers, which as the name implies, store in an upright position, the lip being extended from the platform for storage. An example of a vertically storing dock leveler is shown in FIG. 3. Conventionally, when a platform 40 is raised for storage, the lip 50 retracts automatically, so that pressure in the main lift cylinder 110 must increase sufficiently, as in the case of a horizontal storing dock leveler, for the sequence valve to switch over, and pressure to increase in the lip cylinder 160.

Thus, known hydraulic circuits for vertically storing dock levelers (and also for horizontal storing dock levelers) do not extend the lip during raising of the platform, but rather wait until after the platform has been raised, as the pressure in the main lift cylinder otherwise is insufficient to permit the lip to be extended. More importantly, the lip actually retracts automatically during raising of the platform, so that full extension of the lip is necessary. As a result, storage of the vertically storing dock leveler takes extra time.

One type of vertically storing dock leveler control circuit uses a normally closed (N/C) main solenoid valve which requires electrical power in order to open. The operation of such a valve, then, would be the opposite of that for a normally open valve. Examples of the electrical and hydraulic circuits for such a system are shown in FIGS. 4 and 5.

In FIG. 5, a pump manifold 150 includes a shuttle valve 152, a primary port 153, a sequence valve 154, a secondary port 155, a reservoir 157, a pump 162, and a motor 164. A main difference between this hydraulic circuit and that of FIG. 2 is that, when the main solenoid valve 100 is in its normally closed position, fluid cannot flow into or out of the main lift cylinder 110, so that the platform remains locked. The FIG. 5 circuit shares an important deficiency with the FIG. 3 circuit, in that movement of the lip is incidental to the movement of the platform.

SUMMARY OF THE INVENTION

In view of the foregoing, it is one object of the invention to provide a vertically storing dock leveler which stores quickly.

It is a second object of the invention to provide a vertically storing dock leveler in which lip retraction during movement of the platform is prevented. As a result, when the platform is raised, only that extension of the lip necessary for full extension need be effected. If the lip is partially extended, then only the remaining extension need be performed.

To achieve the foregoing and other objects, the invention provides a lip control hydraulic circuit for a vertically storing dock leveler including a lip solenoid valve, which normally is open, and which is energized when the platform is being raised.

With this additional valve, if the lip already is fully extended when the platform is being raised, no additional extension of the lip is necessary. On the other hand, if the lip is partially retracted when the platform is being raised, the lip does not retract any further, so that no additional extension of the lip, beyond what is necessary to achieve full extension, is required.

BRIEF DESCRIPTION OF THE DRAWINGS

The foregoing and other objects and features of the invention now will be described in detail by way of a preferred embodiment, depicted in the accompanying drawings, in which.

DETAILED DESCRIPTION OF A PREFERRED EMBODIMENT

Figure 6:
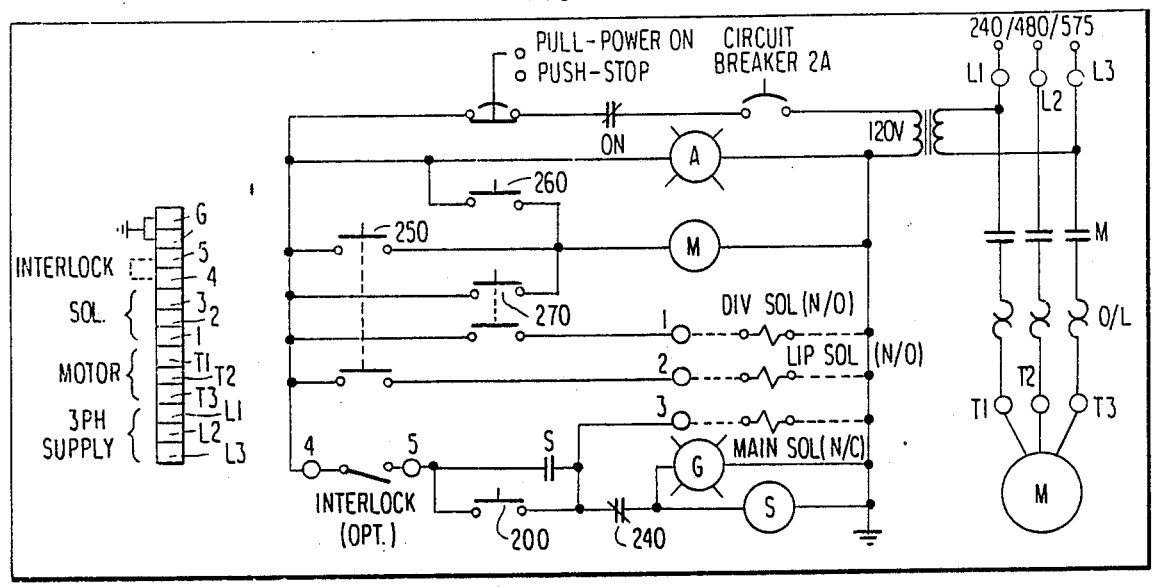
FIGS. 6 and 7 are an electrical and an hydraulic schematic, respectively, for a control circuit in accordance with the present invention.
Figure 7:
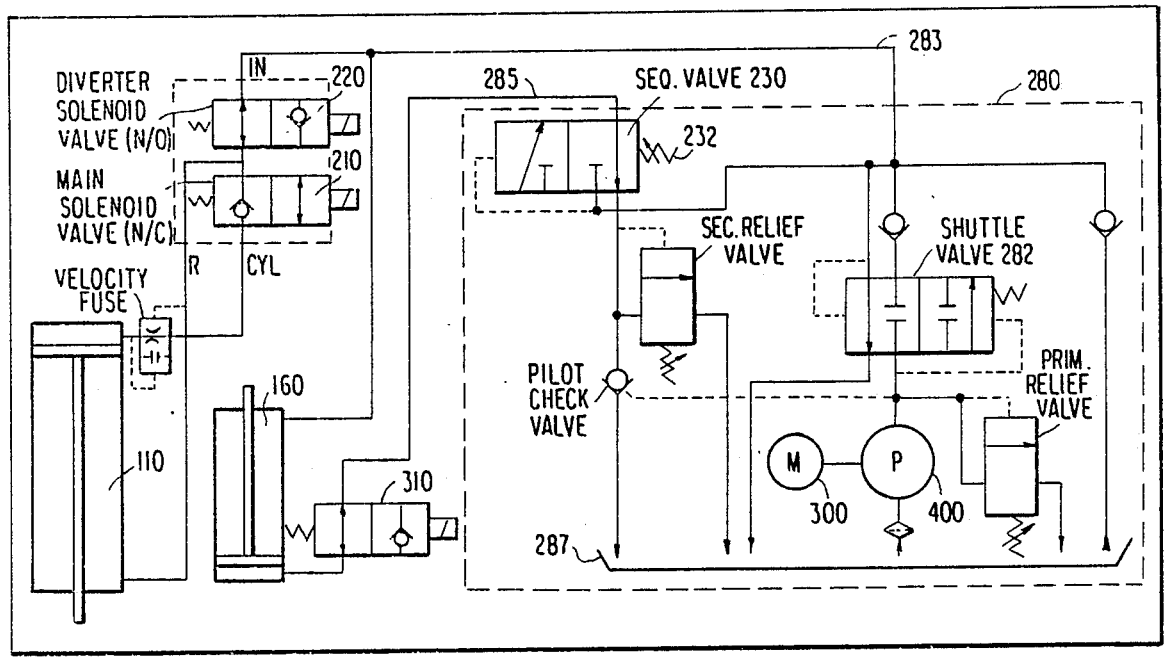

Referring to FIGS. 6 and 7, a complete raising and lowering operation of a vertically storing dock leveler, using the control circuit according to the present invention, will be described. At the outset, it should be noted that a normally closed main solenoid valve 210 and a normally open diverter solenoid valve 220 are provided, both of which are poppet valves. These valves have two operational positions. In one position, free fluid flow is permitted in either of two directions. In the other position, free fluid flow is permitted in one direction, but not in the other. These poppet valves, then, operate differently from spool valves, which either permit free fluid flow in both directions, or prohibit such flow.

Figure 1:
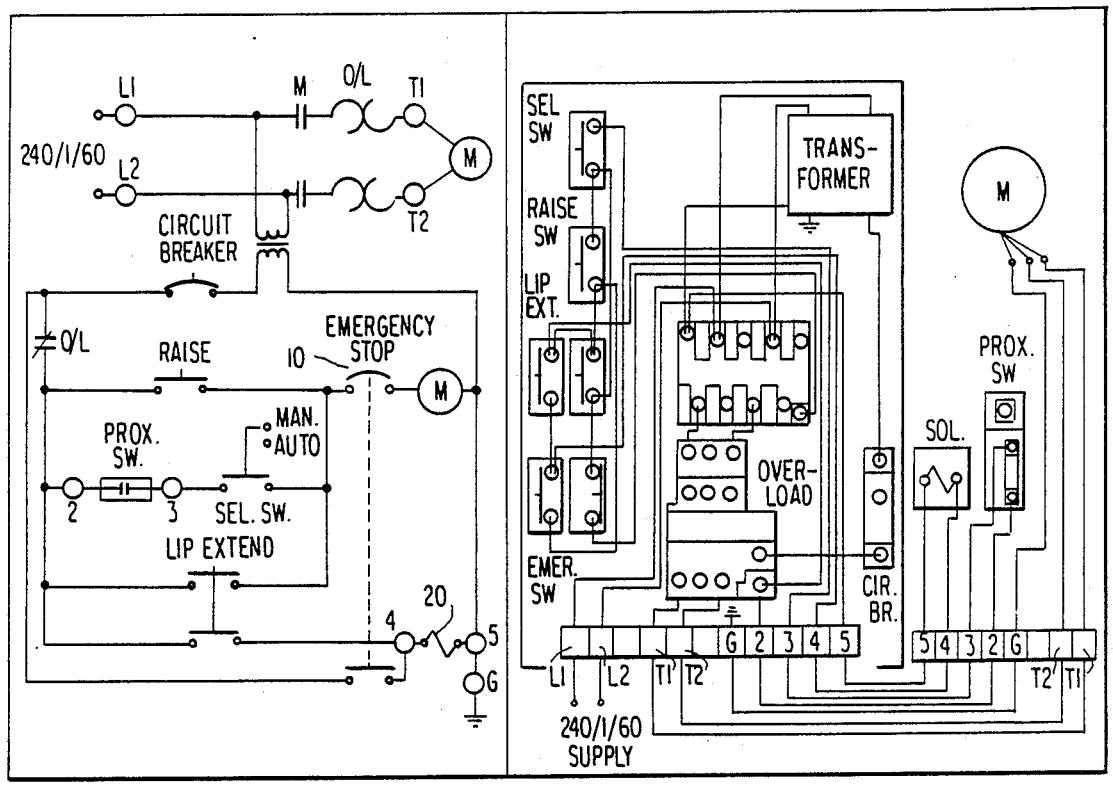
FIGS. 1 and 2 are an electrical and an hydraulic schematic, respectively, for a control circuit employing a normally open valve for the emergency stop feature in a conventional pit style dock leveler.
Figure 2:
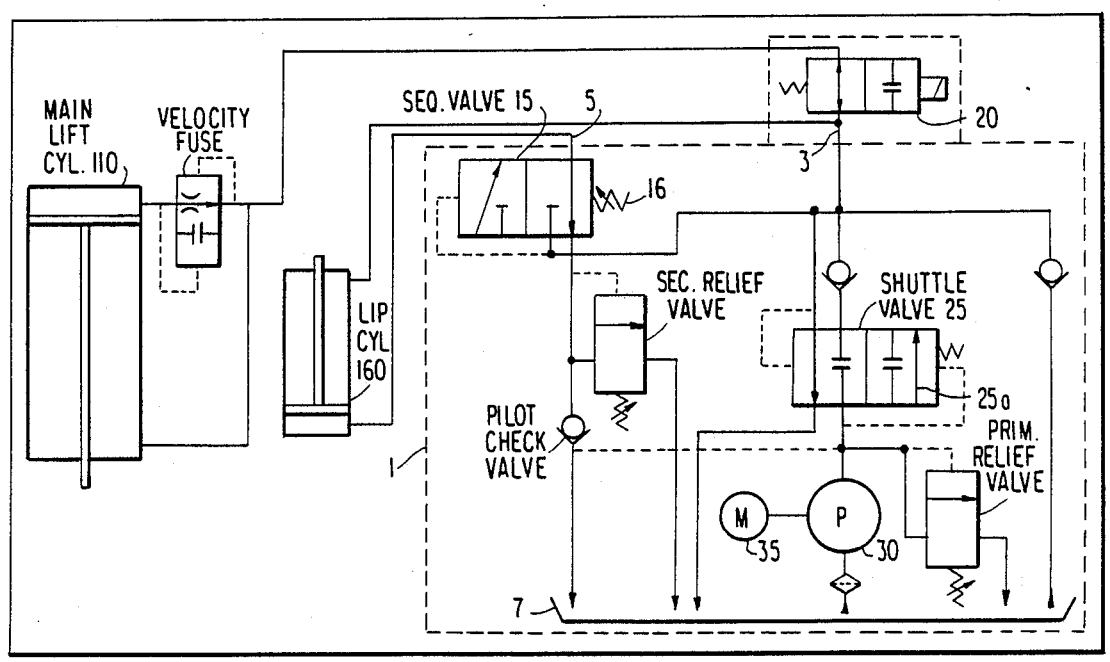
Figure 3A:
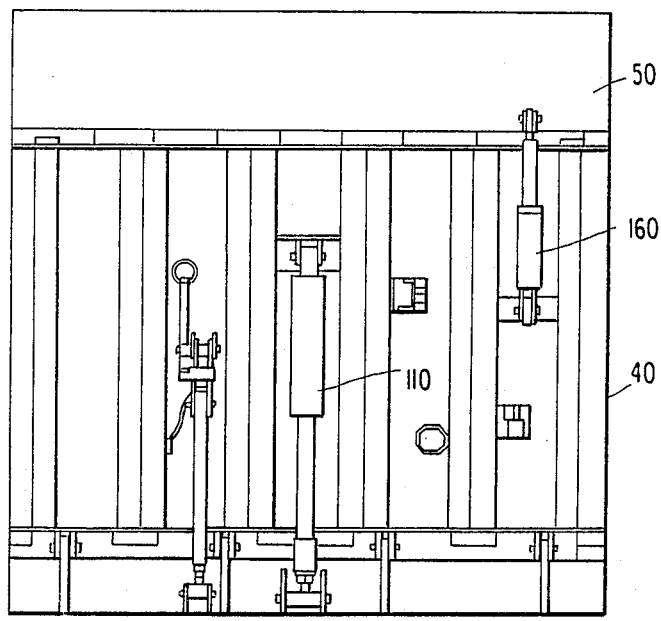
FIGS. 3A and B show a schematic view of the principal operational portions of a vertical dock leveler.
Figure 3B:
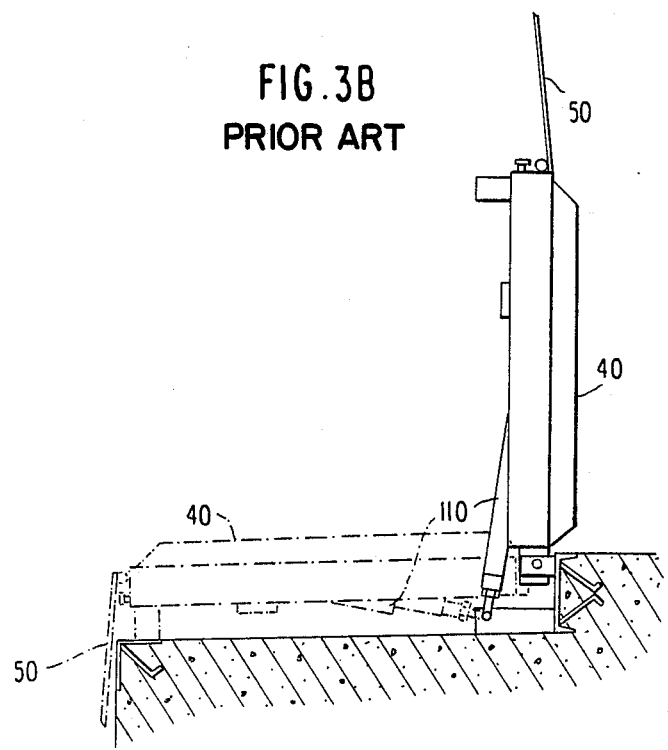
Figure 4:
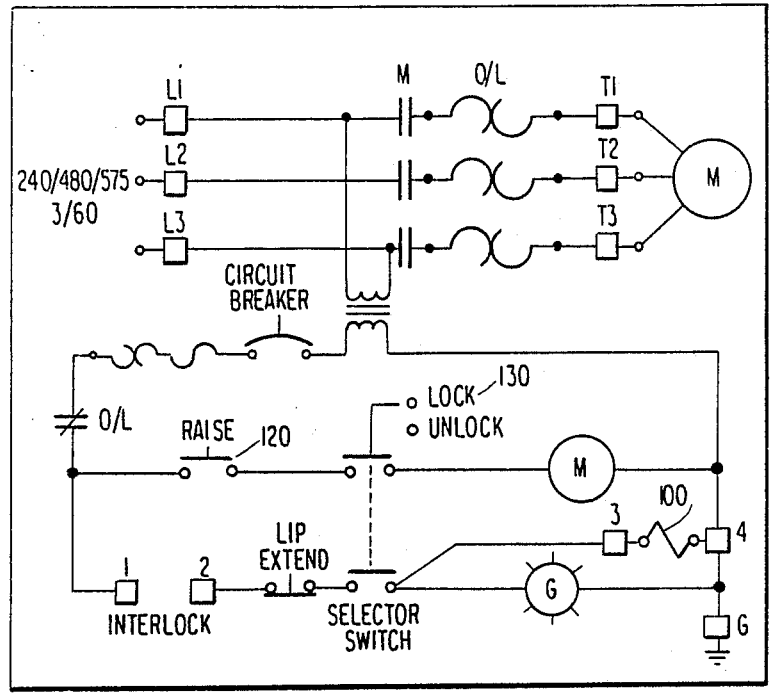
FIGS. 4 and 5 are an electrical and an hydraulic schematic, respectively, for a control circuit employing a normally closed valve for the emergency stop feature in a conventional vertically storing dock leveler.
Figure 5:
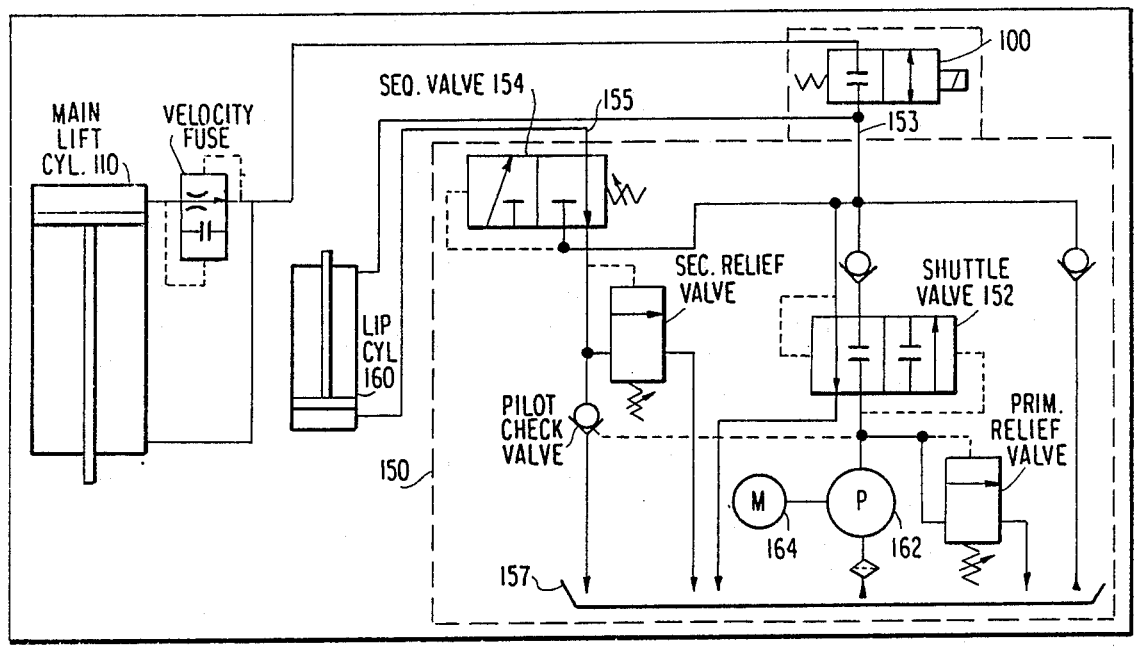

The operation of the control circuit is as follows. First, in response to depression of a raise switch 250 to raise the platform 40 (FIG. 3), the main solenoid valve 210 is closed, preventing the platform from lowering. A pump 400 is started, and oil is directed to the main lift cylinder 110, causing the cylinder 110 to extend, and the platform 40 to rise. Oil also is directed to the retract side of the lip cylinder, as is done in the case of the hydraulic circuit of FIG. 2. However, while this action is occurring, a normally open lip solenoid valve 310 is energized, and prevents the lip 50 from retracting. Thus, the lip 50 retains its position while the platform 40 is being raised.

When the main lift cylinder 110 is fully extended, the pressure increases at the primary port 283 of the pump manifold 280. As a result, the sequence valve 230 switches over, shifting against pressure provided by a spring 232, causing the valve 230 to switch positions. As a result, fluid flows out of the secondary port 285, rather than into it. The normally open lip solenoid valve 310 permits fluid to flow into the extend end of the lip cylinder 160, causing it to extend, and hence extending the lip 50. Once the lip 110 is fully extended, the pump 400 is shut off. At this point, the lip solenoid valve 310 is deenergized.

To retract the lip 50, the motor is started, and raises the main lift cylinder 110. The lip solenoid valve 310 is not energized, permitting oil to flow from the extend side of the lip cylinder 160, thus permitting the lip 50 to retract as the platform 40 is being raised. The main solenoid valve 210 is closed so as to prevent fluid flow out of the main lift cylinder 110, and thus prevent the platform 40 from lowering. However, fluid flow to the main lift cylinder 110 is permitted because, as mentioned earlier, the main solenoid valve is a poppet valve.

To extend the lip 50, a lip extend button 270 is pressed. As a result, fluid flow to the main lift cylinder 110 is blocked because a normally open diverter solenoid valve 220, which normally permits fluid flow to the main lift cylinder 110, is closed. As a result, fluid pressure at the primary port 283 increases, and the sequence valve 230 shifts, in a manner similar to that described for the circuit of FIG. 2. Fluid flow thus is directed to the extend side of lip cylinder 160, resulting in extension of the lip 50.

As a result of the foregoing, optimal manipulation of the lip is possible. The wasted automatic retraction of the lip is prevented, and no additional extension of the lip to compensate for automatic retraction is necessary.

Other operations of the control circuit of the invention are possible as a result of the above-described configuration. For example, looking at the electrical schematic in FIG. 6, when the lower switch 200 is depressed, the coil of a normally open relay S is energized, and the contacts are closed, the main solenoid valve 210 being energized so as to open, and to enable the platform 40 to lower.

However, FIG. 6 also shows that depression of other switches which energize one of the main solenoid valve 210, the lip solenoid valve 310, and the diverter solenoid valve 220, start the motor, causing the normally closed contacts of relay 240 to open, and the normally open contacts of the relay S to open, closing the main solenoid valve 210, and preventing lowering of the platform. For example, depression of the lip retract switch 260 or the lip extend switch 270 will cause the normally open contacts of the relay S to open, and the normally closed main solenoid valve 210 to close, preventing lowering of the platform 40.

Further, power failure also will cause the normally open contacts of the relay S to open, and again preventing lowering of the platform. This last feature is a very useful safety feature, since otherwise a vertically stored platform could fall if the mechanical retainer, which may be provided with such vertically storing levelers, were somehow unlatched. Also, the opening of the contacts of the relay S is automatic upon power failure, so that no affirmative action by the operator is required.

While one embodiment of the invention has been described above in detail, various changes and modifications within the scope and spirit of the invention will be apparent to those of working skill in this technological field. Thus, the invention is to be considered as limited only by the scope of the appended claims.

What is claimed is:

1. An hydraulic circuit for a vertically storing dock leveler, said leveler including a platform and a lip pivotably connected to said platform, said hydraulic circuit comprising:
    raising and lowering means for raising and lowering said platform;
    extending and retracting means for extending and retracting said lip; and
    lip control circuit means, responsive to said raising and lowering means, for preventing retraction of said lip during raising and lowering of said platform.

2. An hydraulic circuit as claimed in claim 1, wherein:
    said leveler further comprises a main lift cylinder for controlling a position of said platform, and a lip cylinder for controlling a position of said lip;
    said raising and lowering means comprises a raise switch having at least two positions, and a normally closed main solenoid valve, responsive to at least one of said at least two positions of said raise switch, for opening said normally closed main solenoid valve; and
    said lip control circuit means comprises a normally open lip solenoid valve, responsive to said at least one of said at least two positions of said raise switch, for closing said open lip solenoid valve and preventing said lip from retracting.

3. An hydraulic circuit as claimed in claim 2, wherein: said leveler comprises a pump for pumping fluid into and out of said main lift cylinder and said lip cylinder in response to actuation of said raising and lowering means and said extending and retracting means;

said extending and retracting means comprises:
a lip retract switch and a lip extend switch, each having at least two positions; and
diverter solenoid means, responsive to at least one of said at least two positions of said lip extend switch, for preventing flow of said fluid into said main lift cylinder and diverting said flow to said lip cylinder, for extending said lip.

* * * * *